US009191649B2

(12) United States Patent
Hung et al.

(10) Patent No.: US 9,191,649 B2
(45) Date of Patent: Nov. 17, 2015

(54) SYSTEMS AND METHODS TO CAPTURE A STEREOSCOPIC IMAGE PAIR

(75) Inventors: Szepo Robert Hung, Carlsbad, CA (US); Ruben M. Velarde, Chula Vista, CA (US); Thomas Wesley Osborne, San Diego, CA (US); Liang Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 13/208,838

(22) Filed: Aug. 12, 2011

(65) Prior Publication Data
US 2013/0038701 A1  Feb. 14, 2013

(51) Int. Cl.
H04N 13/02 (2006.01)
H04N 13/00 (2006.01)
G06T 7/00 (2006.01)

(52) U.S. Cl.
CPC .......... *H04N 13/0221* (2013.01); *G06T 7/0075* (2013.01); *H04N 13/0022* (2013.01); *H04N 13/0271* (2013.01); *H04N 13/0296* (2013.01); *G06T 2207/20068* (2013.01)

(58) Field of Classification Search
USPC .......................................................... 348/49
See application file for complete search history.

(56) References Cited

U.S. PATENT DOCUMENTS

| 4,754,327 | A | 6/1988 | Lippert |
| 4,966,436 | A | 10/1990 | Mayhew et al. |
| 5,325,193 | A | 6/1994 | Pritchard et al. |
| 5,883,695 | A | 3/1999 | Paul |
| 6,486,881 | B2 * | 11/2002 | Hunter et al. ................. 345/473 |
| 7,864,240 | B2 * | 1/2011 | Ide et al. ........................ 348/347 |
| 2003/0152263 | A1 | 8/2003 | Kawano et al. |
| 2009/0066786 | A1 | 3/2009 | Landa |
| 2010/0316282 | A1 | 12/2010 | Hope |

(Continued)

FOREIGN PATENT DOCUMENTS

| CN | 101150667 A | 3/2008 |
| CN | 102012625 A | 4/2011 |

(Continued)

OTHER PUBLICATIONS

"3D-Bearbeitung", C'T Digitale Fotografie, vol. 02/11, Jun. 30, 2011, pp. 28-31, XP002684266, with English Machine Translation of Abstract.

(Continued)

*Primary Examiner* — Tat Chio
*Assistant Examiner* — Nguyen Truong
(74) *Attorney, Agent, or Firm* — Knobbe Martens Olson & Bear LLP

(57) ABSTRACT

Described are a system, apparatus, and method to capture a stereoscopic image pair using an imaging device with a single imaging sensor. Particularly, discussed are systems and methods for capturing a first and second image through an image sensor, determining a vertical and horizontal disparity between the two images, and applying corrections for geometric distortion, vertical disparity, and convergence between the two images. Some embodiments contemplate displaying a directional indicator before the second image of the stereoscopic image pair is captured. By displaying a directional indicator, a more optimal position for the second image of the stereoscopic image pair may be found, resulting in a higher quality stereoscopic image pair.

41 Claims, 10 Drawing Sheets

(56) References Cited

U.S. PATENT DOCUMENTS

2011/0025829 A1 2/2011 McNamer et al.
2011/0102548 A1 5/2011 Kim et al.

FOREIGN PATENT DOCUMENTS

GB 2337390 A 11/1999
GB 2405764 A 3/2005

OTHER PUBLICATIONS

Atanassov K., et al., "3D Image processing architecture for camera phones," Proc. of SPIE—IS & T Electronic Imaging, SPIE, 2011, vol. 7864, pp. 786414-1-786414-12.

Partial International Search Report—PCT/US2012/049754—ISA/EPO—Oct. 25, 2012.

International Search Report and Written Opinion—PCT/US2012/049754—ISA/EPO—Feb. 22, 2013.

* cited by examiner

SYSTEMS AND METHODS TO CAPTURE A STEREOSCOPIC IMAGE PAIR

TECHNICAL FIELD

One aspect of the invention relates to imaging devices, and in particular, to methods, apparatus, and systems for the capture of stereoscopic images utilizing a single imaging sensor on an imaging device.

BACKGROUND

In the past many years, digital imaging capabilities have been integrated into a wide range of devices, including digital cameras and mobile phones. Recently, the ability to capture stereoscopic images with these devices has become technically possible. Device manufacturers have responded by introducing devices integrating multiple digital imaging sensors. A wide range of electronic devices, including mobile wireless communication devices, personal digital assistants (PDAs), personal music systems, digital cameras, digital recording devices, video conferencing systems, and the like, make use of multiple imaging sensors to provide a variety of capabilities and features to their users. These include not only stereoscopic (3D) imaging applications, such as 3D photos and movies, but also higher dynamic range imaging and panoramic imaging.

However, the addition of a second digital imaging sensor comes with some disadvantages. For example, the additional cost of a second imaging sensor and the associated electronics can be prohibitive in at least some market segments. Additionally, a second imaging sensor impacts the usability of the device in a number of ways. For example, accommodation of a second imaging sensor requires the device to be somewhat larger than a device with only a single sensor. Additionally, the power capabilities of the device must be sized to support powering both imaging sensors simultaneously. This may require larger and more costly power handling circuitry. Battery life of the device may also be affected, perhaps requiring a larger battery.

SUMMARY

Some of the embodiments may comprise a method of capturing a stereoscopic image. The method may comprise the capturing of a first image through an imaging sensor. The method may further comprise the capturing of a second image through the imaging sensor, and the determining of the vertical disparity between the first image and the second image. The method may further comprise determining the horizontal disparity between the first image and the second image, determining the geometric distortion between the first image and the second image, determining a convergence point between the first image and the second image, and applying a correction to create at least one corrected image. In other embodiments, the convergence point is determined based on a depth range and a depth histogram. In alternate embodiments, the vertical disparity is determined by the cross correlation of row sum vectors. Some embodiments may further comprise the generating of a stereographic image pair based on the corrected image. In other embodiments, the above elements may be performed repetitively.

Other embodiments may comprise a method of capturing a stereoscopic image. The method may comprise the capturing of a first image through an imaging sensor, the displaying of a directional indicator on an electronic display, capturing a second image through the imaging sensor, and generating a stereoscopic image based on the first image and the second image. In alternate embodiments, the method may further comprise displaying a portion of the first image on a corresponding portion of an electronic display and displaying a portion of a preview image from the imaging sensor on a corresponding portion of the electronic display. In other embodiments, the method may further comprise displaying a transparent version of the first image on an electronic display, or displaying a transparent version of a preview image on the electronic display. In still other embodiments, the method may further comprise displaying an indication on the electronic display of the horizontal shift required to capture a high quality image. Other embodiments may include the displaying of a dynamically estimated quality indicator. In some embodiments, the capturing of the second image is performed in response to a user actuated control, while in other embodiments, the second image is captured automatically. In these embodiments, the automatic capture of the second image may be based on the horizontal disparity between a first image and a preview image. In other embodiments, the capture of the second image is based at least in part on input from an auto focus module or an accelerometer or a frame disparity between the first image and the real time image.

Other embodiments may comprise an imaging device including an imaging sensor and an electronic processor, wherein the electronic processor is configured to control the imaging sensor. These embodiments may also include a control module configured to capture a first image using the imaging sensor, capture a second image using the imaging sensor, determine the vertical disparity between the first image and the second image, determine the horizontal disparity between the first image and the second image, determine the geometric distortion between the first image and the second image, determine a convergence point between the first image and the second image, and apply a correction to create at least one corrected image. In some embodiments, the method may further comprise creation of a stereoscopic image pair based on the corrected image. In some embodiments, the elements may be performed repetitively. In other embodiments, the imaging device may further comprise a wireless telephone handset. In other embodiments, the control module may be configured to capture the second image automatically. Some embodiments of the device further comprise a user actuated control, wherein the control module is further configured to capture the first image in response to a first actuation of the user actuated control and to capture a second image in response to a second actuation of the user actuated control.

Other embodiments include an imaging device comprising an imaging sensor, an electronic display, and a processor, wherein the processor is configured to control the imaging sensor and the electronic display. These embodiments further comprise a control module configured to capture a first image using the imaging sensor, display a directional indicator on the electronic display, capture a second image using the imaging sensor, and generate a stereoscopic image based on the first image and the second image. In some embodiments, the control module is further configured to determine the horizontal disparity between the first image and the second image, and the display of the directional indicator is based on the horizontal disparity. In other embodiments, the device further comprises an accelerometer, wherein the display of the directional indicator is based on input from the accelerometer. In alternate embodiments, the control module is further configured to display a portion of the first image on the electronic display, while in still other embodiments, the control module is further configured to display a portion of a preview image on the electronic display. In other embodiments, the portion of the first image and the portion of the preview image are displayed simultaneously.

Other embodiments include a non-transitory computer readable medium containing processor executable instructions that are operative to cause a processor to capture a first image using an imaging sensor, capture a second image using the imaging sensor, determine the vertical disparity between the first image and the second image, determine the horizontal disparity between the first image and the second image, determine the geometric distortion between the first image and the second image, and determine a convergence point between the first image and the second image, and apply a correction to create at least one corrected image. Other embodiments further comprise executable instructions operative to cause a processor to generate a stereographic image pair based on the corrected image. Some other embodiments include instructions operative to cause a processor to determine the vertical disparity based on the cross correlation of row sum vectors.

Other embodiments include a non-transitory computer readable medium containing processor executable instructions that are operative to cause a processor to capture a first image using an imaging sensor, display a directional indicator, capture a second image through the image sensor, and generate a stereoscopic image based on the first image and the second image. Other embodiments further include instructions operative to cause a processor to display a portion of the first image on a portion of an electronic display and display a portion of a preview image on a portion of the electronic display. Some other embodiments may comprise instructions operative to cause a processor to display a transparent version of the first image on an electronic display or display a transparent version of a preview image on the electronic display.

Other embodiments include an imaging device comprising means for capturing a first image through an imaging sensor, means for capturing a second image through the imaging sensor, means for determining the vertical disparity between the first image and the second image, means for determining the horizontal disparity between the first image and the second image, means for determining the geometric distortion between the first image and the second image, means for determining a convergence point between the first image and the second image, and means for applying a correction to create at least one corrected image. Some embodiments may further comprise means for generating a stereographic image based on the corrected image.

Other embodiments include an imaging device comprising means for capturing a first image using an imaging sensor, means for displaying a directional indicator, means for capturing a second image through the imaging sensor, and means for generating a stereoscopic image based on the first image and the second image.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Implementations disclosed herein provide systems, methods and apparatus for capturing a stereoscopic image with a device including only one imaging sensor. Particularly, some embodiments described herein contemplate capturing two separate images using the one imaging sensor, and generating a stereoscopic image based on the two images. One embodiment includes providing a directional indicator on an electronic display, indicating in which direction the imaging sensor should be moved before capturing the second image. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 1:
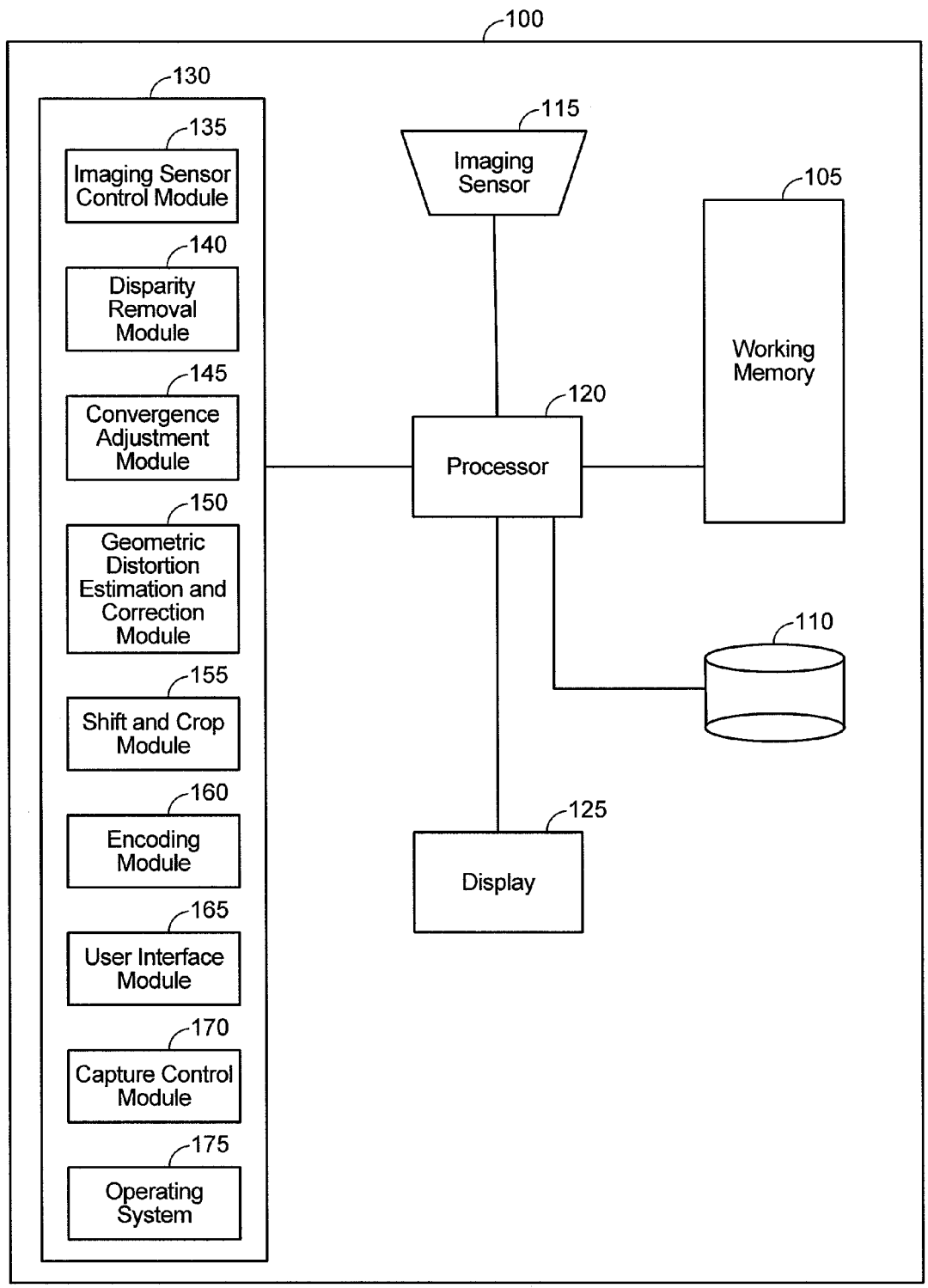
FIG. 1 is a block diagram depicting a device implementing some operative embodiments of the invention disclosed.

FIG. 1 depicts a high-level block diagram of a device 100 having a set of components including a processor 120 linked to an imaging sensor 115. A working memory 105, storage 110, electronic display 125, and memory 130 are also in communication with the processor 120.

Device 100 may be a cell phone, digital camera, personal digital assistant, or the like. Device 100 may also be a more stationary device such as a desktop personal computer, video conferencing station, or the like that uses an internal or external camera for capturing images. A plurality of applications may be available to the user on device 100. These applications may include traditional photographic applications, high dynamic range imaging, panoramic video, or stereoscopic imaging such as 3D images or 3D video.

Processor 120 may be a general purpose processing unit or a processor specially designed for imaging applications. As shown, the processor 120 is connected to a memory 130 and a working memory 105. In the illustrated embodiment, the memory 130 stores an imaging sensor control module 135, disparity removal module 140, convergence adjustment module 145, geometric distortion estimation and correction module 150, shift and crop module 155, encoding module 160, user interface module 165, capture control module 170, and operating system 175. These modules include instructions that configure the processor to perform various image processing and device management tasks. Working memory 105 may be used by processor 120 to store a working set of processor instructions contained in the modules of memory 130. Alternatively, working memory 105 may also be used by processor 120 to store dynamic data created during the operation of device 100.

As mentioned above, the processor is configured by several modules stored in the memories. The imaging sensor control module 135 includes instructions that configure the processor 120 to adjust the focus position of imaging sensor 115. The imaging sensor control module 135 also includes instructions that configure the processor 120 to capture images with the imaging sensor 115. Therefore, processor 120, along with image capture control module 135, imaging sensor 115, and working memory 105 represent one means for capturing an image using an imaging sensor. The disparity removal module 140 provides instructions that configure the processor 120 to detect and eliminate vertical disparity between two images captured by imaging sensor 115. Disparity removal module 140 may also provide instructions to detect horizontal disparity between two images captured by imaging sensor 115. The convergence adjustment module contains instructions that configure the processor to adjust the convergence point between two images captured with the imaging sensor 115. Geometric Distortion Estimation and Correction module 150 contains instructions that configure the processor to detect geometric distortion caused by misalignment of two images captured by imaging sensor 115. Shift and crop module 155 includes instructions that configure the processor 120 to shift image one and image two in relation to each other in order to correct for vertical disparity between the two images. Shift and crop module 155 may also include instructions to crop image 1 and/or image 2 to achieve consistent alignment between the two images. Encoding module 160 includes instructions that configure the processor to encode images captured by imaging sensor 115 into a stereoscopic image. Therefore, instructions contained within encoding module 160 represent one means for generating a stereoscopic image based on a first image and a second image. User interface module 165 includes instructions that configure the processor to display information on the electronic display 125.

Capture control module 170 includes instructions that control the overall image processing functions of device 100. For example, capture control module 170 may include instructions that call subroutines in imaging control module 135 in order to configure the processor 120 to capture a first and second image using the imaging sensor 115. Capture control module 170 may then call disparity removal module 140 to determine the horizontal disparity between the two images. Capture control module 170 may then call geometric distortion estimation and correction module 150 to determine the geometric distortion between the first and second images. Capture control module may then call subroutines within the convergence adjustment module 145 to adjust a convergence point between two images.

Operating System module 175 configures the processor to manage the memory and processing resources of device 100. For example, operating system module 175 may include device drivers to manage hardware resources such as the electronic display 125, storage 110, or imaging sensor 115. Therefore, in some embodiments, instructions contained in the image processing modules discussed above may not interact with these hardware resources directly, but instead interact through standard subroutines or APIs located in operating system component 175. Instructions within operating system 175 may then interact directly with these hardware components.

Processor 120 may write data to storage module 110. While storage module 110 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

Although FIG. 1 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1 illustrates two memory components, to include memory component 130 comprising several modules, and a separate memory 105 comprising a working memory, one with skill in the art would recognize several embodiments utilizing different memory architectures. For example, a design may utilize ROM or static RAM memory for the storage of processor instructions implementing the modules contained in memory 130. Alternatively, processor instructions may be read at system startup from a disk storage device that is integrated into device 100 or connected via an external device port. The processor instructions may then be loaded into RAM to facilitate execution by the processor. For example, working memory 105 may be a RAM memory, with instructions loaded into working memory 105 before execution by the processor 120.

Figure 2:
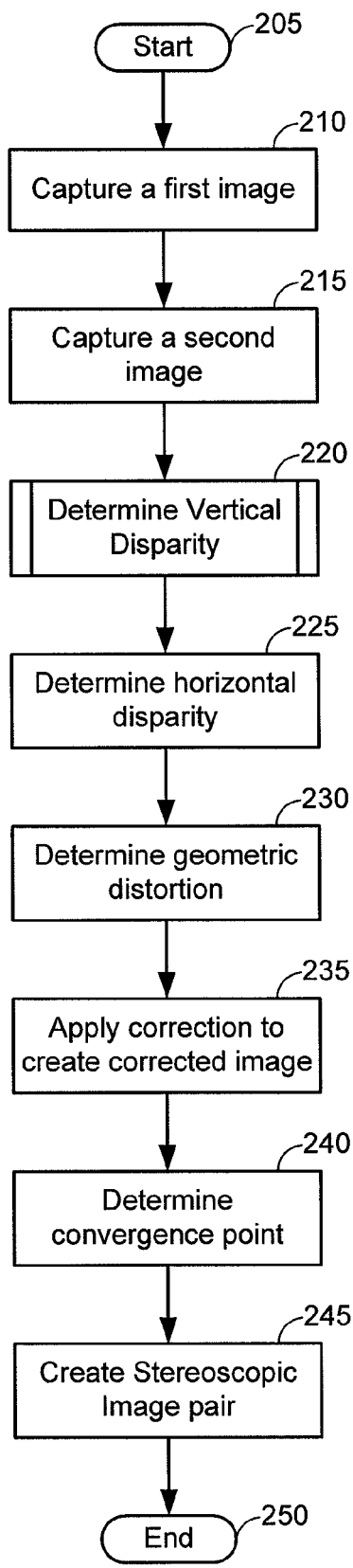
FIG. 2 is a flow chart depicting a process utilized in one embodiment of a capture control module.

FIG. 2 is a flow chart illustrating a process 200 that runs within one embodiment of the capture control module 170 of FIG. 1. The process 200 begins at start block 205 and then transitions to block 210 where a first image is captured. The first image may be captured by instructions in capture control module 170 calling subroutines inside imaging sensor control module 135. Imaging sensor control module 135 then configures the processor to control imaging sensor 115, possibly via operating system module 175, to capture an image. Process 200 then moves to block 215 where a second image is captured. Process 200 then moves to block 220 where instructions determine the vertical disparity between the first and second image. These instructions may be located in the disparity removal module 140 of FIG. 1. It is well known that vertical disparity between two stereoscopic images can create nausea, headaches, and other physical effects. Therefore, the removal of vertical disparity from a stereoscopic image ensures a pleasant viewing experience.

Figure 3:
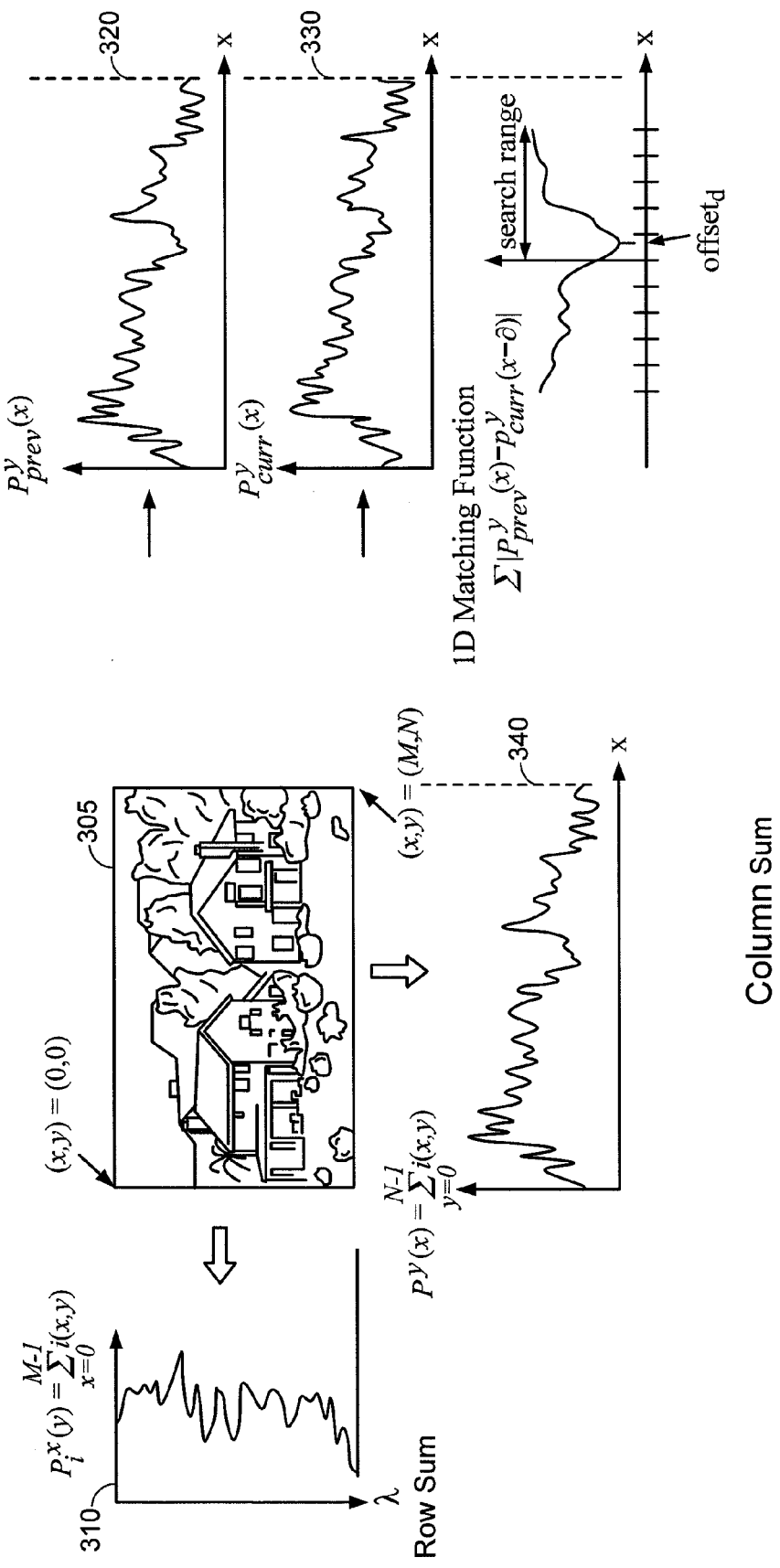
FIG. 3 illustrates image row summation and the creation of a row sum vector, used to perform a best fit between the row sum vectors of two images. Column sum vectors are similarly illustrated.

In the illustrated embodiment, block 220 of process 200 may determine the vertical disparity between the first and second images by first summing the rows of each image. This summation process creates two vectors, one vector for each image. Each element of a vector represents one row sum for an image. An example vector is shown in FIG. 3, item 310. The rows of the image 305 in FIG. 3 have been summarized, producing a vector represented by the graph 310. A row sum for two images, taken by the same imaging sensor but from different imaging sensor positions, is illustrated in FIG. 3. Image 320 is taken from a first position and image 330 is taken from a second position. Differences in the two graphs represent variation between the two images.

However, the vectors have substantial similarities, for example there is a general correspondence between the peaks and valleys of the two graphs. These similarities allow a best fit operation to be performed on the two vectors. In some embodiments, a best fit may be determined by identifying an offset between the two vectors that minimizes the sum of absolute differences between positions of the two vectors. While row summing provides a relatively simple solution to disparity recognition and adjustment, it has some disadvantages. For example, its effectiveness is scene dependent, and it may fail completely in some cases. Additionally, its precision can be affected when there is misalignment between the two images, for example, a misalignment in pitch can effect the accuracy of a row summing based solution. Image misalignment due to scaling (one sensor closer to a scene than another sensor) can also effect the accuracy of a vertical disparity determination based on row summing. Other embodiments may form vectors based on the results of a horizontal edge detection process. A best fit is then performed on the horizontal edge vectors in a similar manner as that described above.

This best fit operation will identify an offset by which one graph may be adjusted to best align with the other. This offset can be applied to one of the images to align the images vertically. Therefore, instructions within vertical disparity removal module 140 performing a best fit of row sum vectors represents one means for determining the vertical disparity between two images.

Other embodiments of block 220 (FIG. 2) may determine vertical disparity using other techniques. For example, some embodiments may identify a best match within a local neighborhood of the two images. For example, an embodiment may locate key feature points within one image and search for the best match in the other image. Therefore, instructions within vertical disparity removal module 140 performing a best match within a local neighborhood for a key feature point represent another means for determining the vertical disparity between two images.

Alternate embodiments may utilize an embedded motion sensor such as an accelerometer to determine angular motion and positional shift between two images. The relative vertical disparity can be computed based on the relative motion occurring between the capture of the two images. Thus, instructions within a vertical disparity removal module 140 utilizing an embedded motion sensor such as an accelerometer to calculate the relative motion occurring between the capture of two images represents another means for determining the vertical disparity between two images.

After the vertical disparity has been determined, process 200 moves to block 225 where the horizontal disparity is determined. Horizontal disparity detection may be performed in a similar manner to vertical disparity detection, with the exception that vectors are created by summarizing the columns of an image instead of the rows. This column summation process is also illustrated in FIG. 3. FIG. 3, graph 340 represents values of a vector created by summarizing the columns of an image. In a process similar to that described above for vertical disparity, a correction for the horizontal disparity can be obtained by determining a best fit between the two images' column sum vectors. Therefore, instructions that summarize the columns of two images to create two column sum vectors, and perform a best fit between the two column sum vectors represents one means for determining a horizontal disparity between two images.

Alternate embodiments may utilize the feature point technique described above to also determine horizontal disparity. Therefore, instructions in a disparity removal module 140 determining a best match for a feature point in a local neighborhood of two images represents one means for determining a horizontal disparity between the two images.

Returning to FIG. 2, Process 200 then moves to block 230 where the geometric distortion is determined. Block 230 may be performed by instructions contained in the geometric distortion estimation and correction module 150 that configure processor 120. In some embodiments, the means for geometric distortion estimation is for instructions to perform feature point matching within the geometric distortion estimation and correction module 150. By matching the feature points between image 1 and image 2, which may be taken from different locations, instructions can create a three dimensional projection matrix to correct for geometry distortion. These techniques are known in the art. Other means for determining a geometric distortion between two images may utilize a motion sensor such as an accelerometer. Instructions record the relative shift in location between the capture of the two images. Most modern accelerometers can measure this shift across six independent axis. If an accelerometer is embedded in an imaging device such as device 100, some embodiments may also utilize it to assist in estimation of the vertical and horizontal disparity discussed above.

Next, process 200 moves to block 235, where a correction is applied to one or both of the images. Block 235 may be performed by instructions contained in any one or combination of the disparity removal module 140, convergence adjustment module 145, geometric distortion estimation and correction module 150, shift and crop module 155, or the capture control module 170 of device 100, illustrated in FIG. 1. Instructions in these modules represent one means for applying a correction to create a corrected image.

To correct for any geometric distortion, block 235 may rely on the angular displacement information determined in block 230. Once the angular displacement is known, a three dimensional projection matrix is estimated. One image may then be corrected to properly match the other image. Instructions implementing these techniques represent one means for applying a correction to an image.

To correct for any vertical disparity, block 235 may shift and/or crop one or both images. For example, the first image may be cropped to remove disparity with respect to the second image. However, because the first image is now smaller in the cropped dimension, the second image will also need to be cropped to maintain dimensions equivalent to the first image. This cropping results in a stereoscopic image pair with a smaller vertical field of view than that of the original images. However, eliminating vertical disparity typically requires the removal of a maximum of five percent of image height on the bottom and top of the image to produce a vertically aligned stereoscopic image pair. This reduces the vertical field of view by a total of ten percent. Instructions contained in a shift and crop module 155 that perform cropping one or both images as described above represent another means for applying a correction to create a corrected image.

Once the appropriate corrections have been applied, process 200 moves to block 240 where the convergence point of the first and second images is determined. Block 240 may be performed by instructions contained within the convergence adjustment module 145 of FIG. 1. Once the horizontal disparity is known, one means for determining the convergence point in some embodiments is instructions that set the convergence point to be one half of the global horizontal disparity. Alternatively, another means to determine a convergence point between two images is for instructions to first estimate a depth range for the scene and create a depth histogram. The convergence point is then set by instructions such that the stereoscopic depth falls into a comfortable viewing zone. These techniques are known in the art.

Next, process 200 moves to block 245 where a stereoscopic image pair is created based on any corrected images. In one embodiment, block 245 may be performed by instructions in encoding module 160. The original first and second images may also be used. Process 200 then transitions to end state 250.

Figure 4:
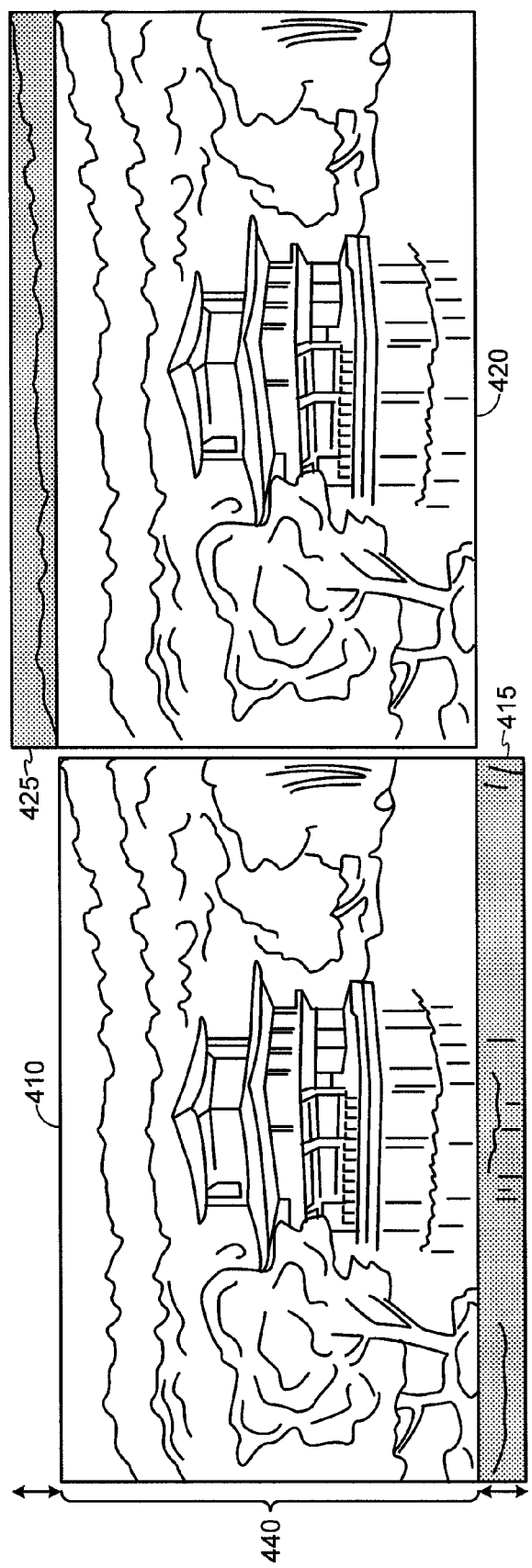
FIG. 4 illustrates vertical disparity between two images, and how one embodiment may crop the images to reduce or eliminate the vertical disparity.

One embodiment of a cropping process is illustrated by the images shown in FIG. 4. Illustrated are two images of a building on a body of water. Image 410 was taken from a slightly lower perspective than image 420, but using the same image sensor. Accordingly, image 410 includes a greater portion of the lake in its field of view, while image 420 includes a greater portion of the sky in its field of view. The portions of each image not included in the other image are represented by the shaded portions of each image, identified as 415 and 425. As illustrated, the two images include significant vertical disparity, which may be eliminated before forming a stereoscopic image pair. To eliminate the vertical disparity, the shaded portion of each image 415 and 425 will be cropped, resulting in a final field of view represented by the common portion of the two images, identified by the bracketed area 440.

Figures 5A, 5B:
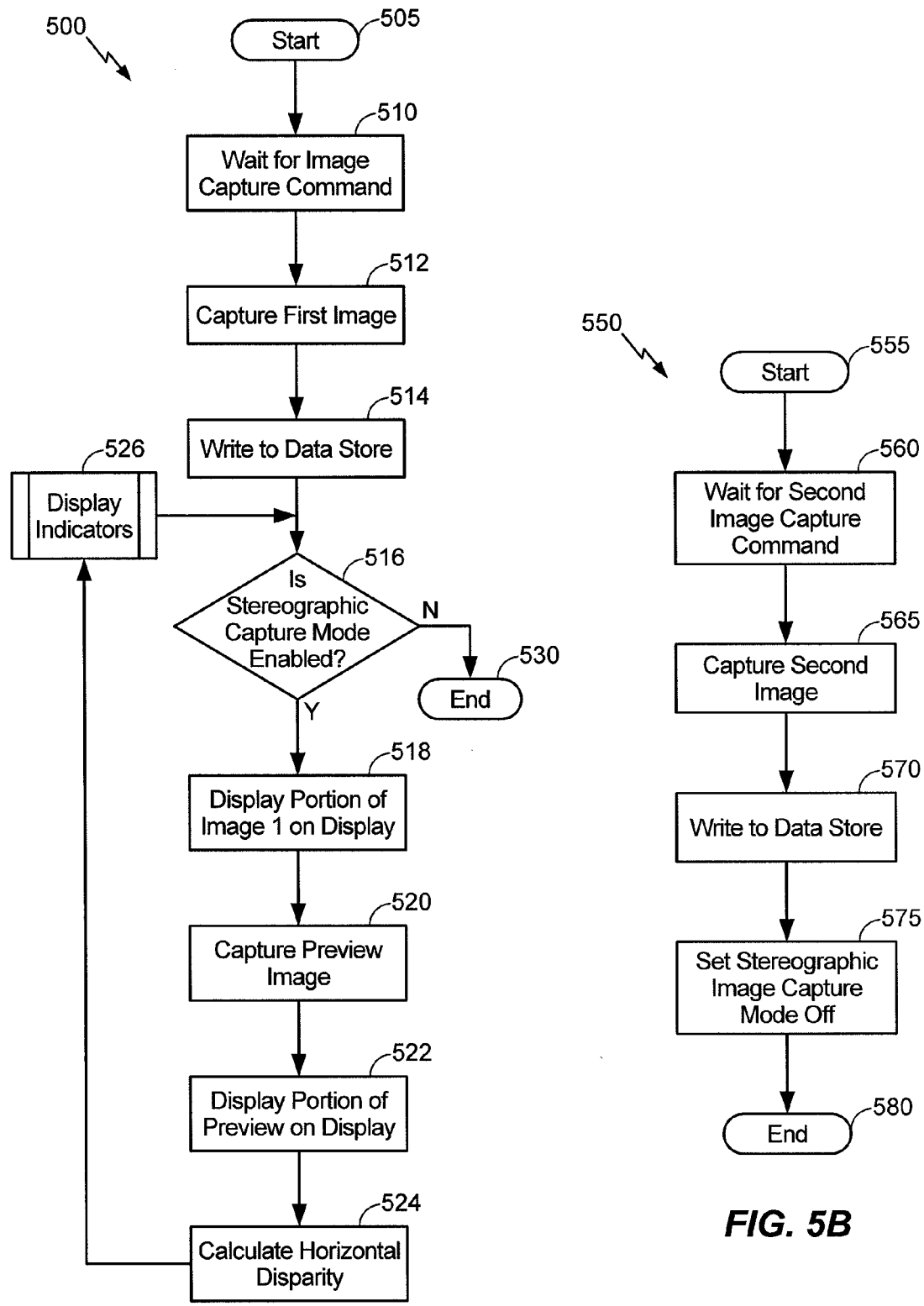
FIG. 5A and FIG. 5B are flow charts depicting one embodiment of processes used by a capture control module to capture a stereographic image pair.

FIG. 5A and FIG. 5B are flow charts depicting one embodiment of processes used by a capture control module to capture a stereographic image pair. FIG. 5A is a flow chart illustrating a process 500 that runs within one embodiment of the capture control module 170 of FIG. 1. Closely related to illustrated process 500 is process 550, illustrated in FIG. 5B. Process 550 may also run within one embodiment of the capture control module 170 of FIG. 1. Process 500 and process 550 work together to display information on an electronic display regarding the optimal position of the imaging sensor and to capture the first and second image of a stereoscopic image pair. The embodiment illustrated by process 500 and process 550 relies on user input to capture the second image before forming a stereoscopic image. Process 500 is responsible for capturing the first image of the stereoscopic image pair, and for managing the display of information on the electronic display, while process 550 captures the second image and exits the device from stereoscopic capture mode.

Process 500 may be performed by instructions included in capture control module 170 of device 100, illustrated in FIG. 1. Process 500 begins at start state 505 and then transitions to block 510 where process 500 waits for an image capture command. The image capture command may occur when a user actuates a device control, or by more automatic means. For example, the imaging device 100 may include a self timer that automatically captures an image after a particular delay. Alternatively, other embodiments of device 100 may include remote control means that command an image capture remotely, for example via either a wired or wireless connection to device 100.

After a capture command occurs, process 500 moves to block 512 where a first image is captured. Instructions implementing process 500 may invoke subroutines located in imaging sensor control module 135 of device 100, illustrated in FIG. 1, to capture the first image. Instructions in those subroutines may configure processor 120 to control imaging sensor 115 to capture the first image. Process 500 then moves to block 514 where instructions store the image to a data store. In some embodiments, the image may be stored in a data store such as data store 110 of FIG. 1. Process 500 then moves to decision block 516 where instructions determine if the device is currently in a stereoscopic capture mode. Such a mode may be enabled for example if a user has selected a stereoscopic mode of operation before performing the first image capture command. If the stereoscopic capture mode is not enabled, process 500 moves to block 530 and process 500 ends.

However, if the stereoscopic capture mode is enabled, some embodiments of process 500 move to block 518 and display a portion of the first captured image on the electronic display. Embodiments of the display of the first captured image are described in more detail in the explanation of FIG. 7 and FIG. 8 below. Process 500 then moves to block 520 where instructions capture a preview image. A preview image may be a real time image as perceived by the imaging sensor 115 of device 100 of FIG. 1. Process 500 then moves to block 522 where a portion of the preview image is also displayed on the electronic display. Embodiments illustrating the display functions of blocks 518-522 are described further in the explanation of FIG. 8 and FIG. 9 below.

Next, process 500 moves to block 524, where instructions calculate the horizontal disparity between image 1 and the preview image. Block 524 may be performed by subroutines contained in the disparity removal module 140 of device 100, illustrated in FIG. 1. Calculating the horizontal disparity may utilize one of the techniques described above with respect to FIG. 2, including row summation, an orientation sensor, or points of interest matching. Once the horizontal disparity between image 1 and the preview image is understood, process 500 moves to block 526 where instructions display one or more indicators. Block 526 is explained in more detail in the discussion of FIG. 10 below. After indicators are displayed in block 526, process 500 returns to decision block 516. Process 500 then repeats as described above.

Turning now to process 550, the process begins at start state 555 and then moves to block 560 where process 550 waits for a second image capture command. When the second image capture command occurs, process 550 captures the second image in block 565. Block 565 may be implemented by instructions in the capture control module 170, or by the imaging sensor control module 135 of device 100, illustrated in FIG. 1. Process 550 then moves to block 570 where the second image is stored to a data store. Process 550 then moves to block 575 where instructions turn off the stereographic capture mode. Note that when the stereoscopic capture mode is turned off by block 575 of process 550, decision block 516 of process 500 will transition process 500 to end block 530. Thus, process 550 and process 500 interact to complete capture of the stereoscopic image pair, while displaying a directional indicator on a display.

Figure 6:
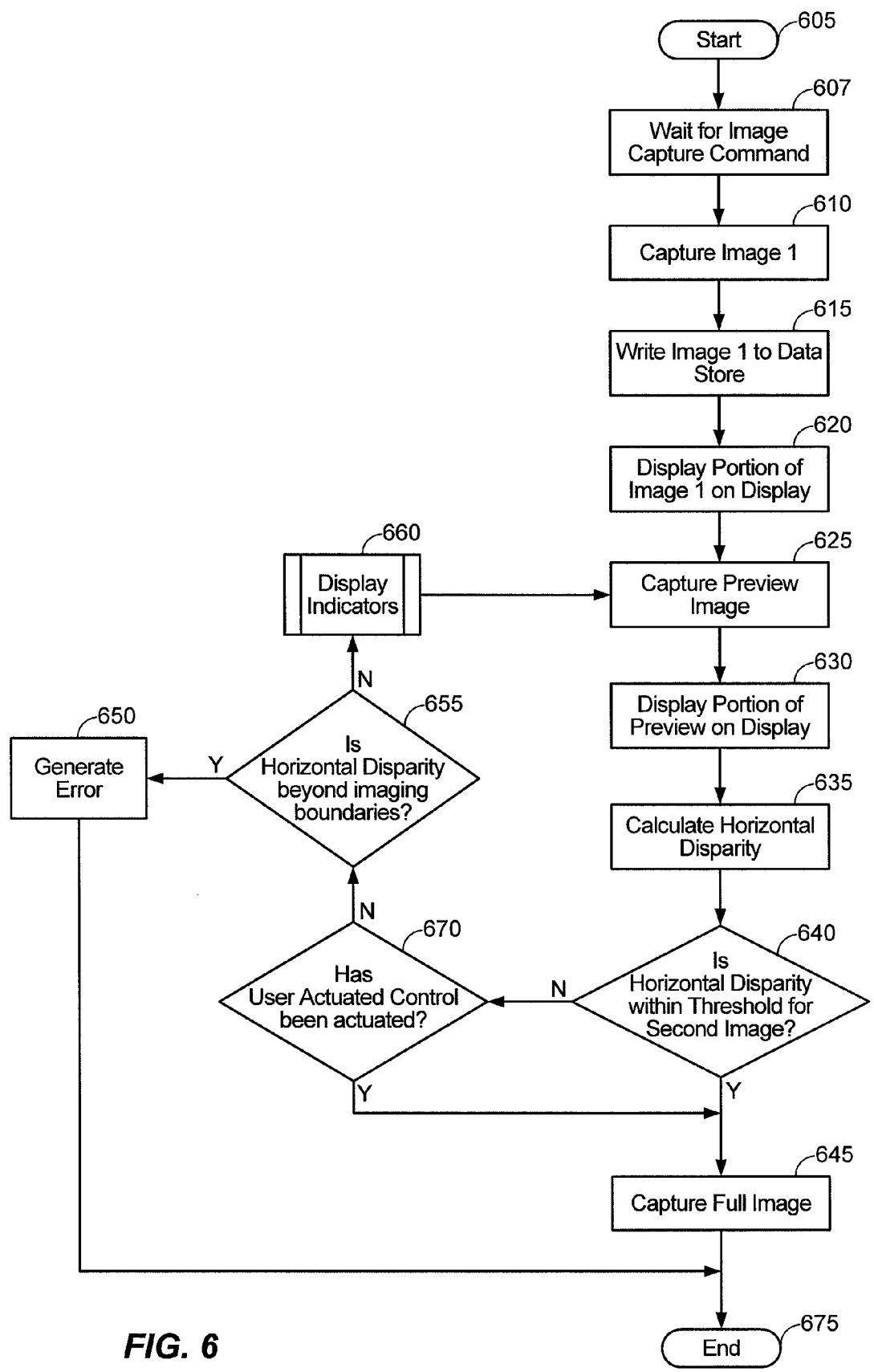
FIG. 6 is a flow chart depicting one embodiment of a process used by a capture control module to automatically capture the second image of a stereographic image pair.

FIG. 6 represents an alternative embodiment of a stereoscopic image pair capture process. Process 600 may be implemented by instructions contained in capture control module 170 of device 100, illustrated in FIG. 1. Unlike process 500 and process 550, process 600 captures the second stereoscopic image automatically. Process 600 begins at start block 605 and then moves to block 607 where instructions implementing process 600 wait for an image capture command. When the image capture command occurs, process 600 moves to block 610 and instructions capture image 1. Image 1 represents the first of two images required to create the stereoscopic image pair. After the image has been captured, process 600 moves to block 615 where instructions write image 1 to a data store. A data store may include a nonvolatile memory such as a flash disk, external hard drive or the like, or it may be a volatile memory such as RAM or the working memory 105 illustrated in FIG. 1.

Next, process 600 moves to block 620 where instructions cause a portion of image 1 to be displayed on an electronic display. Block 620 may be performed in some embodiments by instructions contained in user interface module 165 of device 100, illustrated in FIG. 1. In some other embodiments, the electronic display may be a display similar to display 125 of device 100, illustrated in FIG. 1. Process 600 then moves to block 625 where instructions capture a preview image. The preview image may be a real time image captured from an imaging sensor, for example, the imaging sensor 115 of device 100, illustrated in FIG. 1. Process 600 then transitions to block 630, where a portion of the preview image is also displayed on an electronic display. Block 630 may also be performed in some embodiments by instructions contained in user interface module 165 of device 100.

Process 600 then moves to block 635 where the horizontal disparity between the preview image and image 1 is calculated. Block 635 may be performed by instructions contained in disparity removal module 140 of device 100, and use any of the techniques discussed earlier to calculate horizontal disparity, including a best fit of vectors created by summing the columns of image 1 and the preview image, points of interest matching between image 1 and the preview image, or utilization of an accelerometer to determine the relative position of image 1 with respect to a preview image.

Next, process 600 moves to decision block 640, where the current horizontal disparity is compared against the thresholds required for a second image. In some embodiments, if the current horizontal disparity is within parameters to produce an adequate stereoscopic image pair, process 600 moves to block 645 where the second image is captured. Process 600 then moves to end block 675. If the current horizontal disparity is outside thresholds needed for an adequate stereoscopic image pair, process 600 moves to decision block 670.

In decision block 670, process 600 determines if a user actuated control has been actuated. In some embodiments, such as the embodiment illustrated by process 600, the stereoscopic imaging device provides for an automatic capture mode, but also allows the user to override the automatic capture process and capture the second image of a stereoscopic image pair manually. Block 670 provides for this capability. If the user actuated control has been actuated, process 600 moves to block 645, where the second image is captured. If no user actuated control has been actuated, process 600 moves from decision block 670 to decision block 655.

In decision block 655, the current horizontal disparity is compared against boundary thresholds. Boundary thresholds establish whether the horizontal disparity is so great as to require the imaging device to abort the automatic capture of a second image. Aborting the stereoscopic image capture may be required, for example, when the imaging processing algorithms are unable to determine a correlation between image 1 and the preview image. In such a case, it may be necessary to automatically exit the stereoscopic image capture mode to avoid spurious results for the user. If the current horizontal disparity is beyond these boundaries, process 600 moves to block 650 where an error is generated. Instructions implementing block 650 may generate an error message on display 125 of device 100 for example. These instructions may be contained within the user interface module 165 of device 100. If the horizontal disparity remains within boundaries such that a stereoscopic image pair may be captured, process 600 moves to block 660.

In block 660, one or more display indications are provided on an electronic display, for example, display 125 of device 100, illustrated in FIG. 1. Block 660 is discussed in more detail in the explanation of FIGS. 8-10 below. After the indicators are displayed in block 660, process 600 returns to block 625 and process 600 repeats.

Other embodiments of block 640 may include instructions implementing complex techniques to determine whether a second image should be captured. For example, some embodiments may consider not only whether the current horizontal disparity is within an acceptable range, but also whether the current horizontal disparity is trending toward producing an even higher quality stereoscopic image pair, or conversely if the trend is toward a lower quality stereoscopic image pair.

Figure 7:
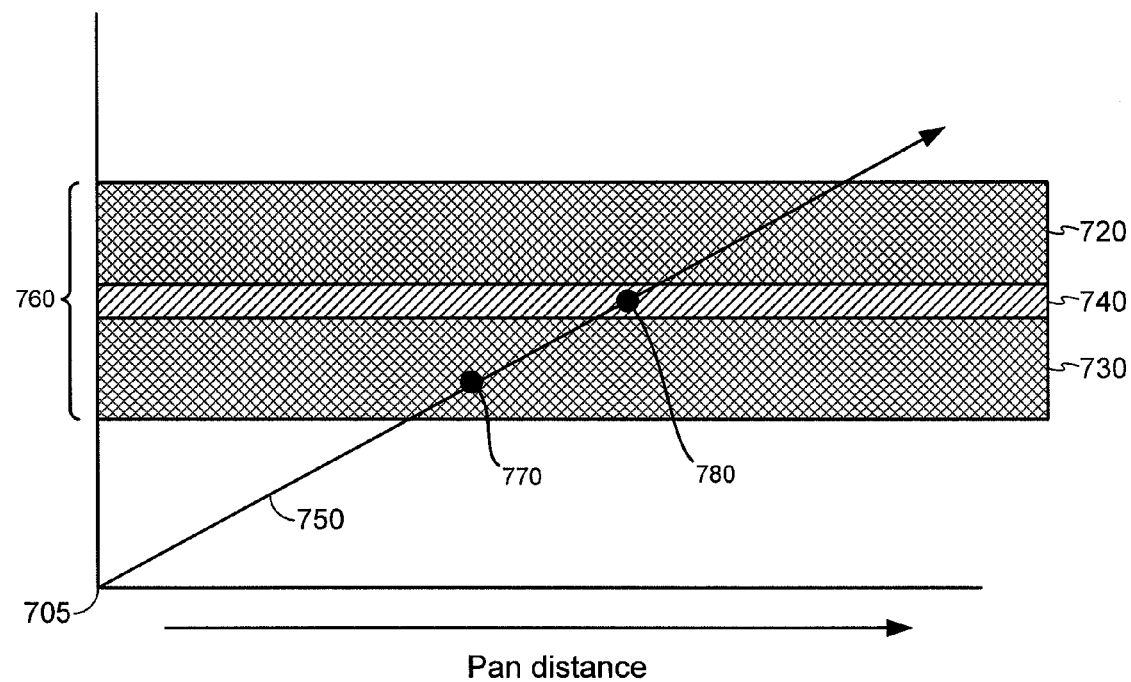
FIG. 7 illustrates how one embodiment of a capture control module may determine the best horizontal disparity for automatically capturing the second image of a stereoscopic image pair.

The advantages of such an approach are illustrated by FIG. 7 which is a graph of horizontal disparity as a function of a pan distance of one imaging sensor. Acceptable stereoscopic images are normally produced when the horizontal disparity falls within the shaded portion of the graph, indicated by the bracketed area 760 of the y axis. The darkly shaded portions 720 and 730 represent horizontal disparity values that produce a stereoscopic image pair of acceptable quality. The narrow lightly shaded region 740 represents optimal horizontal disparity. The diagonal line 750 represents the horizontal disparity for one example imaging scenario.

As the imaging sensor moves from the first image capture position, initial horizontal disparity between the first image and preview image may be close to zero, as illustrated by point FIG. 7, point 705. However, as the imaging sensor pans in a particular direction, horizontal disparity may enter the acceptable range, while remaining sub-optimal. This condition is represented by point 770. While a second image captured at this point will provide a stereoscopic image pair of acceptable quality, it will not be optimal quality. If the horizontal disparity is trending toward a more optimal position, some embodiments may wait to capture the second image. For example, waiting may result in a new horizontal disparity within the optimal zone, represented by point 780. Initiating the capture of the second image at this point may result in a stereoscopic image pair of significantly better quality than if the second image had been captured at point 770.

Figure 8:
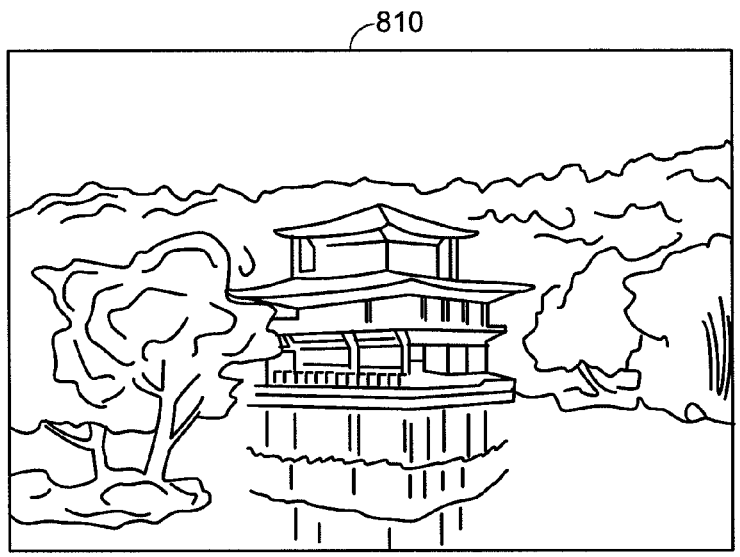
FIG. 8 illustrates one embodiment of an image displayed on an electronic display to facilitate the capturing of a second image of a stereoscopic image pair.
Figure 8:
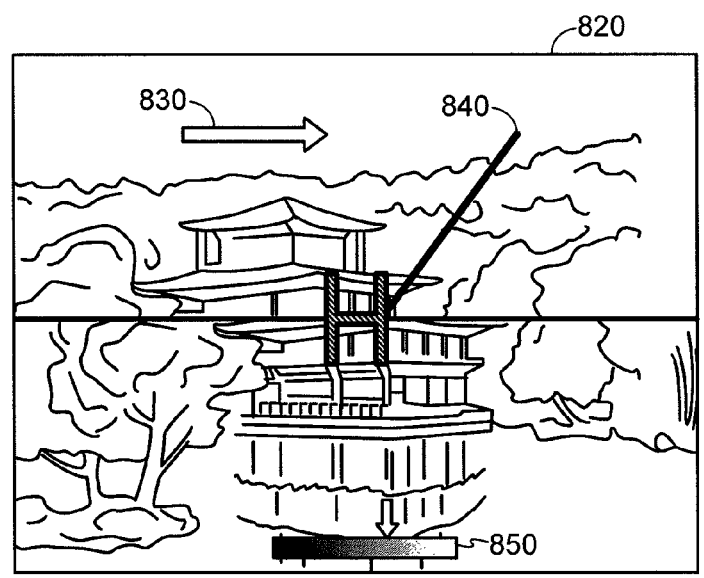

FIG. 8 represents one embodiment of an image displayed on an electronic display that includes a directional indicator for capturing a second image. Image 810 represents the first image captured in a stereoscopic image sequence. Image 810 might be image 1 of process 500 or the first image captured in block 210 of process 200. Image 810 may be captured by imaging sensor 115 of device 100 of FIG. 1. Image 820 represents one embodiment of an image on an electronic display, which includes several displayed elements. First, the upper half of the display includes the upper half of image 810. This portion of the display may be controlled by block 530 of process 500 in some embodiments. Other embodiments may control this portion of the display with block 620 of process 600. The lower half of the displayed image 820 includes another image portion. In the illustrated embodiment, this image portion is a preview image. The display of the preview image may be controlled by block 540 of process 500. Alternatively, block 630 of process 600 may control this portion of the display in some embodiments.

In the illustrated embodiment, the upper half of display 820 also includes an arrow 830. The arrow indicates which direction the imaging sensor should be moved to provide optimal horizontal disparity between image 810, displayed in the upper half of display 820, and the preview image, displayed in the lower half of display 820. Arrow 830 may change color to indicate stereoscopic quality achieved if the snapshot is captured in the current camera position. For example, when stereoscopic quality is far from optimal, the arrow may be red. In some embodiments, arrow 830 may transition to a yellow color as horizontal disparity transitions into a reasonable yet suboptimal zone. The length of arrow 830 may also extend or contract depending on the amount of additional imaging sensor displacement needed to achieve an optimal horizontal disparity. When horizontal disparity achieves an optimal position, in some embodiments the arrow may transition to a different symbol, for example a green light. Alternatively, the arrow may disappear entirely or change to another form.

Some embodiments of displayed image 820 may also include a gridline or ruler indicator 840. The gridline communicates the allowed horizontal shift between the first image, displayed in the upper half of the display 820 in this embodiment, and the preview image, displayed in the lower half of displayed image 820 in this embodiment. The gridline may also change color indicating the level of stereoscopic image quality achieved if the second image is captured in the present imaging sensor position. For example, in some embodiments, the gridline may be red when the current horizontal disparity will result in poor stereoscopic image quality. The gridline may become yellow when the horizontal disparity approaches a reasonable level, and green when the horizontal disparity provides for good stereoscopic image quality.

Some embodiments may also populate a portion of display image 820 with a dynamically calculated stereoscopic image quality indicator, such as status bar 850 shown in the lower portion of display image 820. In the illustrated embodiment, the small arrow above status bar 850 moves horizontally to indicate the stereoscopic image quality level if a second image is captured in the current sensor position. Each color zone within the horizontal bar in the illustrated embodiment corresponds to a particular stereoscopic image pair quality level. In one embodiment, image processing instructions may dynamically calculate the horizontal disparity between a first image and the current preview or real time image to determine where to position the arrow. Other embodiments may choose a different form for their dynamic quality indicator.

Figure 9:
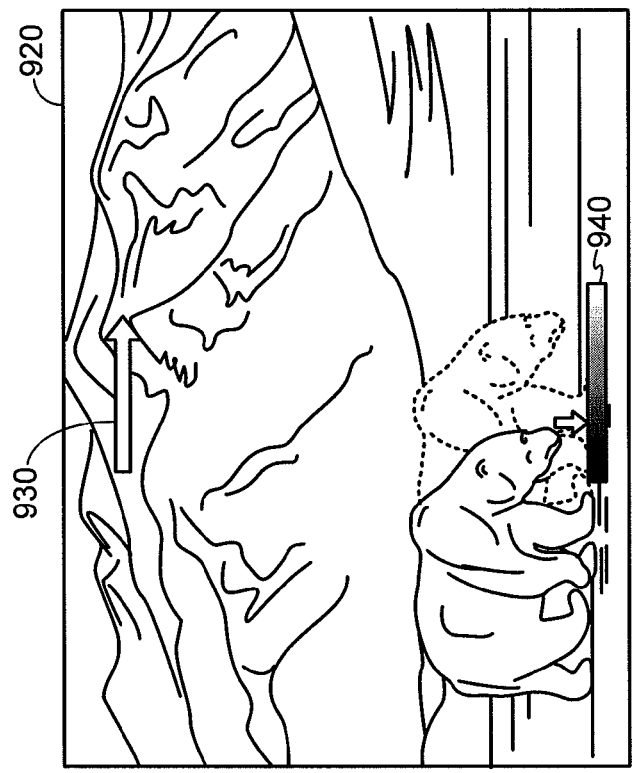
FIG. 9 illustrates another embodiment of an image displayed on an electronic display to facilitate the capturing of a second image of a stereoscopic image pair.
Figure 9:
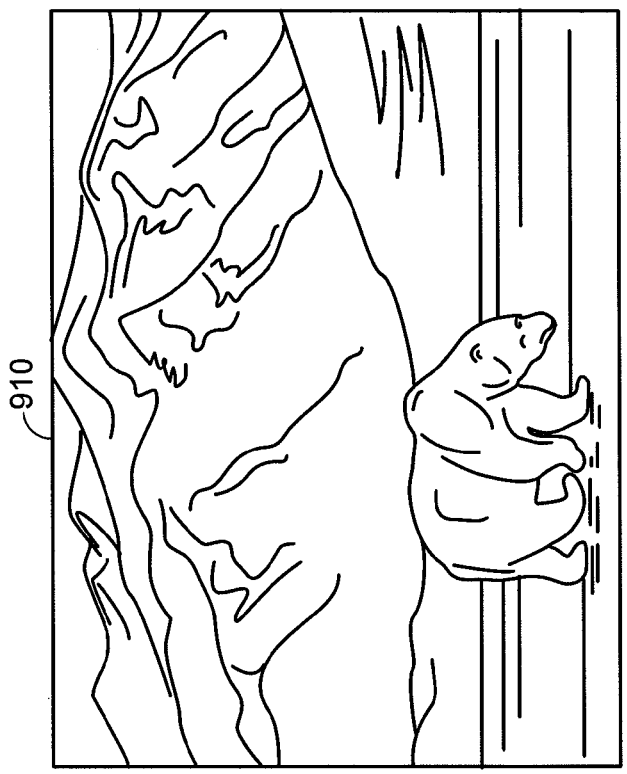

FIG. 9 represents another embodiment of an image displayed on an electronic display to provide guidance for capturing a second image. The first image 910 represents the first image of a stereoscopic image pair. Image 920 represents one embodiment of an image displayed on an electronic display after first image 910 has been captured. Of note is that in image 910, the hump in the brown bear's back is approximately centered in the image. In one embodiment, the brightly lit bear in image 920 is a preview image, or a real time image as currently perceived by a device imaging sensor. The preview image in image 920 shows the bear's hump to the left of center. This shift in the bear's position is due to the imaging sensor being panned to the right after image 910 was captured. Of note however, is the dimly lit image of the bear to the right of the brightly lit preview image. The dimly lit bear's position corresponds to image 910, which is semi-transparently overlaid on the preview image. In some embodiments, the dimly lit bear may be displayed by block 620 of process 600 or block 518 of process 500. In some other embodiments, the brightly lit bear may represent a preview or real time image, and may be displayed by block 522 of process 500 or block 630 of process 600. By transparently overlaying the two images, beneficial guidance is provided as to how to position the imaging sensor before capturing the second image of the stereoscopic image pair.

Note that this embodiment of a stereoscopic apparatus display also includes a directional indicator 930 and a quality indicator 940. In the illustrated embodiment, the directional indicator 930 is indicating a need to pan further right. The quality indicator is communicating that a low quality stereoscopic image pair will result if the second image is captured at the present imaging sensor position. This is shown by the small arrow over a particular portion of the horizontal quality bar 840.

Figure 10:
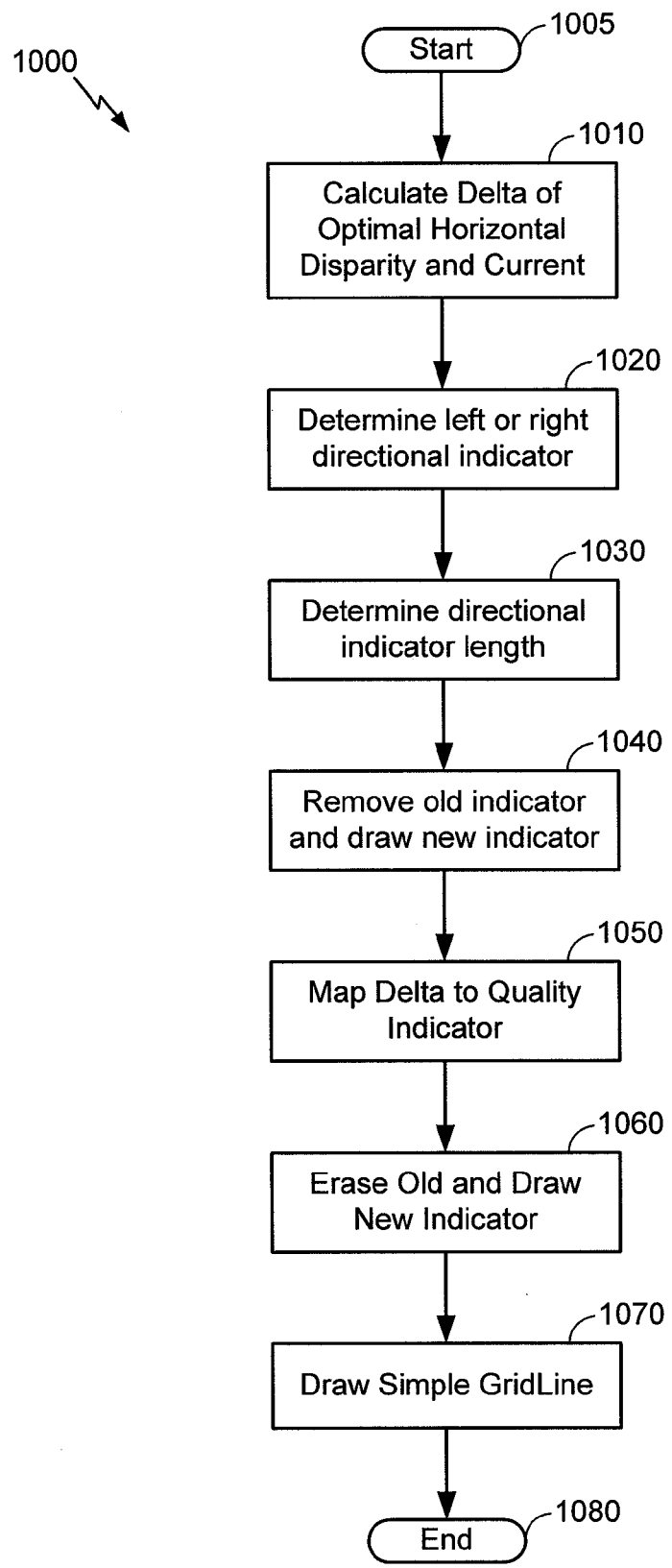
FIG. 10 is a flowchart illustrating one embodiment of a process executing in a capture control module or user interface module that displays a directional indicator on an electronic display.

FIG. 10 is a flow chart illustrating a process 1000 that runs within one embodiment of the capture control module 170 or user interface module 165 of FIG. 1. Process 1000 starts at start state 1005 and then moves to block 1010. In one embodiment, block 1010 is implemented by instructions in the capture control module 170 that determine the horizontal disparity between a first image and the current preview or real time image. Alternatively, the capture control module 170 may call subroutines in the disparity removal module 140, which includes instructions to determine a horizontal disparity between two images in some embodiments.

Next, process 1000 moves to block 1020, and an initial direction for a directional indication is determined. An example directional indication is the arrow 830 of FIG. 8. Some embodiments may default to a left direction after the capture of image 1 in block 515 of process 500, illustrated in FIG. 5 or block 610 of process 600, illustrated in FIG. 6. Other embodiments may default to a right direction. However, in some embodiments, once the imaging sensor has changed horizontal position relative to the position used to capture the first image, the direction of arrow 830 may be determined by the horizontal disparity between the first image and the current preview or real time image. Once the direction of the indicator has been determined, process 1000 moves to block 1030, where the length of the indicator is determined. Some embodiments may maintain an indicator of fixed length, while other embodiments may vary the length of the directional indicator based on the horizontal disparity between the first captured image and the preview or real time image. The width of the directional indicator may also vary based on distance between an optimal horizontal disparity and the current horizontal disparity. Additionally, some embodiments may limit the maximum and minimum width of the directional indicator. For example, in some embodiments, the directional indicator length may be limited to seventy five percent of the horizontal width of the display. Conversely, the length may be limited by a lower bound when horizontal disparity is close to optimal. This length may be determined by the size of the display, or may be limited to a size easily perceivable by the human eye. In some embodiments, when the horizontal disparity approaches optimum, the directional indicator may transition from one form to another. For example, in some embodiments the directional indicator may transform from an arrow, when horizontal disparity is not optimal, to a green light, represented by a green circle or other green indicator, indicating the second picture can now be taken. Other embodiments may transition to a flashing indicator, to communicate a degree of urgency in capturing the second image.

Once the length and direction of the directional indicator are determined, process 1000 moves to block 1040, where any old directional indicator is erased (if present) and the new indicator is displayed based on the parameters determined in blocks 1020 and 1030. Therefore, a capture control module 170 or user interface module 165, containing instructions that perform the blocks 1010-1040 described above represent one means for displaying a directional indicator that indicates a direction to move the imaging sensor.

Next, process 1000 moves to block 1050, and the delta between the current horizontal disparity and an optimal horizontal disparity is mapped to a particular quality indication. In one embodiment, the quality indicator may resemble item 850 of FIG. 8. Optimal horizontal disparity can be approximately 1/30 of the field of view. Thus, when horizontal disparity reaches this level, the illustrated embodiment of FIG. 8 will place the small arrow above the horizontal quality bar 850 over a green portion of the bar. The region to the right of the small arrow represents too small a horizontal disparity, while the region to the left of the arrow represents progressively larger horizontal disparities, with a bright red region to the far left end of the bar representing the worst position for capturing a second image. Once the appropriate mapping of horizontal disparity to quality level is performed, process 1000 moves to block 1060 where any older quality indicator is erased (if present) and a new quality indicator is displayed.

Next, process 1000 moves to block 1070, and a gridline is displayed on the screen. In one embodiment, the gridline may be item 840 of FIG. 8. The gridline communicates the optimal horizontal disparity between the first image and the real time or preview image. Since optimal horizontal disparity is typically found at approximately 1/30 the field of view, the length of the gridline will typically be in that proportion with the width of the display. After the gridline has been displayed, process 1000 moves to end state 1080.

Those having skill in the art will further appreciate that the various illustrative logical blocks, modules, circuits, and process blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of capturing a stereoscopic image, comprising:
   capturing a first image through an imaging sensor;
   displaying a horizontal displacement of the first image relative to a live preview image from the imaging sensor, by displaying an upper half of the first image on an upper half of an electronic display, while simultaneously displaying a lower half of a live preview image captured from the same imaging sensor on a lower half of the electronic display;
   displaying, simultaneous with the display of the upper half of the first image, a line between the bottom of the upper half of the first image and the top of the lower half of the preview image;
   displaying a directional indicator on the electronic display wherein the directional indicator indicates a direction to move the imaging sensor;
   capturing a second image through the imaging sensor; and
   generating a stereoscopic image based on the first image and the second image.

2. The method of claim 1, further comprising displaying a first indication on the electronic display of the horizontal shift required to capture a high quality image.

3. The method of claim 2, wherein the first indication is a gridline or a ruler.

4. The method of claim 1, further comprising displaying a dynamically estimated quality indicator.

5. The method of claim 2, wherein the first indications' color is based on the horizontal disparity between the first image and a preview image.

6. An imaging device configured to capture stereoscopic images, comprising:
   an imaging sensor;
   an electronic display;
   a processor, configured to control the imaging sensor and the electronic display and
   a control module configured to
      capture a first image using the imaging sensor,
      display a horizontal displacement of the first image relative to a live preview image from the imaging sensor, by displaying an upper half of the first image on an upper half of an electronic display, displaying, simultaneous with the display of the upper half of the first image, a lower half of a live preview image captured from the same imaging sensor on a lower half of the electronic display, and
      display, simultaneous with the display of the upper half of the first image, a line between the bottom of the upper half of the first image and the top of the lower half of the preview image;
      display a directional indicator on the electronic display, wherein the directional indicator indicates a direction to move the imaging sensor,
      capture a second image using the imaging sensor, and
      generate a stereoscopic image based on the first image and the second image.

7. The imaging device of claim 6, wherein the control module is further configured to determine a horizontal disparity between the first image and the second image, and the display of the directional indicator is based on the determined horizontal disparity.

8. The imaging device of claim 6, further comprising an accelerometer, wherein the display of the directional indicator is based on input from the accelerometer.

9. A non-transitory computer-readable medium containing processor executable first instructions that when executed perform a method comprising:
   capturing a first image using an imaging sensor;
   displaying a horizontal displacement of the first image relative to a live preview image from the imaging sensor, by displaying an upper half of the first image on an upper half of an electronic display, while simultaneously displaying a lower half of a live preview image captured from the same imaging sensor on a lower half of the electronic display;
   displaying, simultaneous with the display of the upper half of the first image, a line between the bottom of the upper half of the first image and the top of the lower half of the preview image;
   displaying a directional indicator that indicates a direction to move the imaging sensor;
   capturing a second image using the imaging sensor; and
   generating a stereoscopic image based on the first image and the second image.

10. An imaging device comprising:
   means for capturing a first image through an imaging sensor;
   means for displaying a horizontal displacement of the first image relative to a live preview image from the imaging sensor, comprising:
      means for displaying an upper half of the first image on an upper half of an electronic display,
      means for displaying a lower half of a live preview image from the imaging sensor on a lower half of the electronic display simultaneous with the display of the upper half of the first image, and
      means for displaying a line between the bottom of the upper half of the first image and the top of the lower half of the preview image simultaneous with the display of the upper half of the first image;
   means for displaying a directional indicator that indicates a direction to move the imaging sensor;
   means for capturing a second image through the imaging sensor; and
   means for generating a stereoscopic image based on the first image and the second image.

11. The imaging device of claim 6, wherein the control module is configured to display the directional indicator as an arrow, and wherein the arrow may change color to indicate a stereoscopic quality achieved if the second image is captured at the current imaging device position.

12. The imaging device of claim 6, wherein the control module is configured to display the directional indicator as an arrow, and wherein a length of the arrow is based on an amount of imaging sensor displacement needed to achieve an optimal horizontal disparity.

13. The imaging device of claim 6, wherein the control module is configured to transition the directional indicator from an arrow to another symbol when horizontal disparity between the first image and the preview image reaches an optimal position.

14. The imaging device of claim 6, wherein the control module is configured to display the directional indicator as a gridline, wherein the gridline indicates a maximum amount of horizontal shift between the first image and the preview image.

15. The computer readable medium of claim 9, wherein the directional indicator is an arrow, and wherein the method further comprising changing a color of the arrow to indicate a stereoscopic quality achieved if the second image is captured at the current imaging device position.

16. The computer readable medium of claim 9, wherein the directional indicator is an arrow, and wherein a length of the arrow is based on an amount of imaging sensor displacement needed to achieve an optimal horizontal disparity.

17. The computer readable medium of claim 9, further comprising transitioning the directional indicator from an arrow to another symbol when horizontal disparity between the first image and the preview image reaches an optimal position.

18. The computer readable medium of claim 9, wherein the directional indicator is a gridline, and wherein the gridline indicates a maximum amount of horizontal shift between the first image and the preview image.

19. The imaging device of claim 10, wherein the means for displaying a directional indicator is configured to display the directional indicator as an arrow, and wherein the arrow may change color to indicate a stereoscopic quality achieved if the second image is captured at the current imaging device position.

20. The imaging device of claim 10, wherein the means for displaying a directional indicator is configured to display the directional indicator as an arrow, and wherein a length of the arrow is based on an amount of imaging sensor displacement needed to achieve an optimal horizontal disparity.

21. The imaging device of claim 10, wherein the means for displaying a directional indicator is configured to transition the directional indicator from an arrow to another symbol when horizontal disparity between the first image and the preview image reaches an optimal position.

22. The imaging device of claim 10, wherein the means for displaying a directional indicator is configured to display the directional indicator as a gridline, wherein the gridline indicates a maximum amount of horizontal shift between the first image and the preview image.

23. A method of capturing a stereoscopic image, comprising:
- capturing a first image through an imaging sensor;
- displaying a horizontal displacement of the first image relative to a live preview image from the imaging sensor, by displaying an upper half of a live preview image captured from the same imaging sensor on an upper half of an electronic display, while simultaneously displaying a lower half of the first image on a lower half of the electronic display,
- displaying, simultaneous with the display of the upper half, a line between the bottom of the upper half of the preview image and the top of the lower half of the first image;
- displaying a directional indicator on the electronic display wherein the directional indicator indicates a direction to move the imaging sensor;
- capturing a second image through the imaging sensor; and
- generating a stereoscopic image based on the first image and the second image.

24. The method of claim 23, further comprising displaying a first indication on the electronic display of the horizontal shift required to capture a high quality image.

25. The method of claim 24, wherein the first indication is a gridline or a ruler.

26. The method of claim 24, further comprising displaying a dynamically estimated quality indicator.

27. The method of claim 24, wherein the first indications' color is based on the horizontal disparity between the first image and a preview image.

28. An imaging device configured to capture stereoscopic images, comprising:
- an imaging sensor;
- an electronic display;
- a processor, configured to control the imaging sensor and the electronic display and
- a control module configured to
  - capture a first image using the imaging sensor,
  - display a horizontal displacement of the first image relative to a live preview image from the imaging sensor, by displaying an upper half of a live preview image captured by the same imaging sensor on an upper half of an electronic display, displaying, simultaneous with the display of the upper half of the live preview image, a lower half of the first image on a lower half of the electronic display, and
  - display, simultaneous with the display of the upper half of the live preview image, a line between the bottom of the upper half of the preview image and the top of the lower half of the first image;
  - display a directional indicator on the electronic display, wherein the directional indicator indicates a direction to move the imaging sensor,
  - capture a second image using the imaging sensor, and
  - generate a stereoscopic image based on the first image and the second image.

29. The imaging device of claim 28, wherein the control module is further configured to determine a horizontal disparity between the first image and the second image, and the display of the directional indicator is based on the determined horizontal disparity.

30. The imaging device of claim 28, further comprising an accelerometer, wherein the display of the directional indicator is based on input from the accelerometer.

31. The imaging device of claim 28, wherein the control module is configured to display the directional indicator as an arrow, and wherein the arrow may change color to indicate a stereoscopic quality achieved if the second image is captured at the current imaging device position.

32. The imaging device of claim 28, wherein the control module is configured to transition the directional indicator from an arrow to another symbol when horizontal disparity between the first image and the preview image reaches an optimal position.

33. The imaging device of claim 28, wherein the control module is configured to display the directional indicator as a gridline, wherein the gridline indicates a maximum amount of horizontal shift between the first image and the preview image.

34. An imaging device comprising:
- means for capturing a first image through an imaging sensor;
- means for displaying a horizontal displacement of the first image relative to a live preview image from the imaging sensor, comprising:
  - means for displaying an upper half of a live preview image captured with the same imaging sensor on an upper half of an electronic display;
  - means for displaying a lower half of the first image from the imaging sensor on a lower half of the electronic display simultaneous with the display of the upper half of the live preview image; and
  - means for displaying a line between the bottom of the upper half of the preview image and the top of the lower half of the first image simultaneous with the display of the upper half of the first image;
- means for displaying a directional indicator that indicates a direction to move the imaging sensor;
- means for capturing a second image through the imaging sensor; and
- means for generating a stereoscopic image based on the first image and the second image.

35. A non-transitory computer-readable medium containing processor executable first instructions that when executed perform a method comprising:
- capturing a first image using an imaging sensor;
- displaying a horizontal displacement of the first image relative to a live preview image from the imaging sensor, by displaying an upper half of a live preview image captured by the same imaging sensor on an upper half of an electronic display, while simultaneously displaying a lower half of the first image on a lower half of the electronic display;
- displaying, simultaneous with the display of the upper half, a line between the bottom of the upper half of the preview image and the top of the lower half of the first image;
- displaying a directional indicator that indicates a direction to move the imaging sensor;
- capturing a second image using the imaging sensor; and
- generating a stereoscopic image based on the first image and the second image.

36. The computer readable medium of claim 35, further comprising displaying the directional indicator as an arrow.

37. The computer readable medium of claim 35, further comprising changing a color of the arrow to indicate a stereoscopic quality achieved if the second image is captured at the current imaging device position.

38. The computer readable medium of claim 36, further comprising displaying the arrow with a length based on an amount of imaging sensor displacement needed to achieve an optimal horizontal disparity.

39. The computer readable medium of claim 36, the method further comprising transitioning the directional indicator from an arrow to another symbol when horizontal disparity between the first image and the preview image reaches an optimal position.

40. The computer readable medium of claim 35, wherein the directional indicator is a gridline, and wherein the gridline indicates a maximum amount of horizontal shift between the first image and the preview image.

41. The method of claim 1, further comprising displaying the upper and lower halves non-transparently.

\* \* \* \* \*